(12) United States Patent
Ranjan

(10) Patent No.: US 7,376,829 B2
(45) Date of Patent: May 20, 2008

(54) TERMINAL, DATA DISTRIBUTION SYSTEM COMPRISING SUCH A TERMINAL AND METHOD OF RE-TRANSMITTING DIGITAL DATA

(75) Inventor: Karthik Ranjan, Hickory, NC (US)

(73) Assignee: Irdeto Access B.V., Hoofddorp (NL)

( * ) Notice: Subject to any disclaimer, the term of this patent is extended or adjusted under 35 U.S.C. 154(b) by 809 days.

(21) Appl. No.: 10/729,247

(22) Filed: Dec. 4, 2003

(65) Prior Publication Data

US 2004/0123097 A1 Jun. 24, 2004

(30) Foreign Application Priority Data

Dec. 4, 2002 (EP) .................................. 02080137

(51) Int. Cl.
*H04L 9/00* (2006.01)
*H04N 7/167* (2006.01)
*H04N 7/173* (2006.01)
*G06F 17/30* (2006.01)
G06F 7/04 (2006.01)
G06K 9/00 (2006.01)
H04L 9/32 (2006.01)

(52) U.S. Cl. ................ 713/153; 713/151; 713/154; 725/31; 725/91; 726/29

(58) Field of Classification Search ................ 713/151, 713/153, 154; 725/31, 91; 726/29
See application file for complete search history.

(56) References Cited

U.S. PATENT DOCUMENTS 5,138,659 A * 8/1992 Kelkar et al. ................ 380/239
6,647,061 B1 * 11/2003 Panusopone et al. .. 375/240.12
7,039,614 B1 * 5/2006 Candelore ..................... 705/57
7,092,729 B1 8/2006 Fichet et al.
7,120,253 B2 * 10/2006 Ducharme et al. .......... 380/211
7,124,303 B2 * 10/2006 Candelore et al. .......... 713/193
2001/0046299 A1 11/2001 Wasilewski et al.
2002/0094084 A1 * 7/2002 Wasilewski et al. ........ 380/241
2002/0101991 A1 * 8/2002 Bacon et al. ................ 380/212
2002/0150248 A1 * 10/2002 Kovacevic ................... 380/210

\* cited by examiner

*Primary Examiner*—Kambiz Zand
*Assistant Examiner*—Michael J Simitoski
(74) *Attorney, Agent, or Firm*—Schwegman, Lundberg & Woessner P.A.

(57) ABSTRACT

A terminal for receiving and re-transmitting information, comprises a first network adapter for receiving a primary data stream in which the information has been encoded, encrypted according to a key scheme from a primary transmitter through a first network in a first format, an arrangement for receiving entitlement messages, enabling an authorized receiver to decrypt the encrypted data stream, and at least one further network adapter for connection to a secondary network. The terminal is configured to re-transmit at least part of the information in at least one secondary data stream in a second format, differing from the first format, through the second network to at least one secondary terminal connected to the secondary network. The terminal is configured to transmit the secondary data stream(s) encrypted according to the same key scheme and to forward received entitlement messages that enable an authorized receiver to decrypt the secondary data stream(s) to the secondary terminal(s).

16 Claims, 4 Drawing Sheets

US 7,376,829 B2

TERMINAL, DATA DISTRIBUTION SYSTEM COMPRISING SUCH A TERMINAL AND METHOD OF RE-TRANSMITTING DIGITAL DATA

The present patent application claims the priority benefit of the filing date of European Application (EPO) No. 02080137.9 filed Dec. 4, 2002.

FIELD OF THE INVENTION

The invention relates to the area of transcontrol at network boundaries.

BACKGROUND OF THE INVENTION

EP-A-1 089 470 discloses a set-top box that is connected to a television receiver through a video cable and an IEEE 1394 cable. A front end circuit extracts a broadcast signal corresponding to the station selection of a user from a DSS (Direct Satellite System) input from an antenna and outputs it to a descramble circuit. A charging circuit supplies the descramble circuit with the decoding key used for scramble release. A multiplex editing circuit rearranges the timestamp and packet length of an HD broadcast signal (which is MPEG encoded) from the descramble circuit into the structure of a transport stream defined in IEEE 1394 and then outputs it to an encryption circuit. When the broadcast signal concerned is pay per view, the encryption circuit encrypts the transport stream from the multiplex editing circuit. A controller controls a drive to read out a control program recorded in a magnetic disc, an optical disc, a magneto-optical disc or a semiconductor memory, and controls each circuit of the set top box on the basis of the control program thus read out and a command input from a user or the like. The charging circuit is not connected to the encryption circuit.

When the known terminal is employed, the entity transmitting data from the primary transmitter loses control the moment the data is decrypted in the primary terminal. Subsequently, even though the decrypted data is re-encrypted, this entity no longer controls access to the data. The operator of the primary terminal that is used to receive and re-transmit the data through the secondary network can determine which secondary receiver he will enable to decrypt the re-encrypted data stream, by sending them the key used to re-encrypt the data stream.

SUMMARY OF THE INVENTION

The invention, in one exemplary embodiment, provides a terminal for receiving and re-transmitting information, comprising a first network adapter for receiving a primary data stream in which the information has been encoded, encrypted according to a key scheme from a primary transmitter through a first network in a first format, an arrangement for receiving entitlement messages, enabling an authorised receiver to decrypt the encrypted data stream, and at least one further network adapter for connection to a secondary network, wherein the terminal is configured to re-transmit at least part of the information in at least one secondary data stream in a second format, differing from the first format, through the second network to at least one secondary terminal connected to the secondary network, wherein the terminal is configured to transmit the secondary data stream(s) encrypted according to the same key scheme and to forward received entitlement messages that enable an authorised receiver to decrypt the secondary data stream(s) to the secondary terminal(s).

Because forwarded entitlement messages (i.e. generated by the source providing the information to the terminal) are used to enable the secondary receivers to decrypt the re-transmitted data stream, the primary data provider retains control over the further distribution of the data.

In one exemplary embodiment, the terminal is arranged to decrypt the received primary data stream and to encrypt the secondary data stream(s) according to the key scheme.

Thus, the terminal may access the data comprised in the received data stream, for example certain elementary streams in a multiplexed stream. In this way, it can access information, for example tables of identifiers identifying elementary streams, which it may make use of to decide which parts of the received data stream to forward.

According to a further aspect of the invention, a digital data distribution system is provided, comprising a primary network, a primary data transmitter, connected to the primary network and arranged to transmit information encoded in an encrypted primary data stream encrypted according to a key scheme through the primary network in a first format, an entitlement message transmitter, arranged to transmit entitlement messages enabling an authorised receiver to decrypt the encrypted data stream, a secondary network, one or more secondary terminals, connected to the secondary network, and a primary terminal, connected to the first and the second network, arranged to receive the encrypted data stream from the primary data transmitter through the first network and to re-transmit at least part of the information, encoded in at least one secondary data stream in a second format, differing from the first format, to one or more secondary terminals connected to the secondary network, wherein the primary terminal is configured to transmit the secondary data stream(s) encrypted according to the same key scheme and to forward received entitlement messages that enable an authorised receiver to decrypt the secondary data stream(s) to the secondary terminal(s).

The system enables the entity using the primary data transmitter to keep control of the data being retransmitted to the secondary terminal(s).

According to another aspect of the invention, a method of receiving and re-transmitting digital data is provided, comprising:

receiving information encoded in an encrypted primary data stream encrypted according to a key scheme from a primary transmitter through a primary network in a first format, receiving entitlement messages, enabling an authorised receiver to decrypt the encrypted data stream, re-transmitting at least part of the information, encoded in at least one secondary data stream in a second format, differing from the first format, to at least one secondary terminal through a secondary network, wherein the secondary data stream(s) are transmitted encrypted according to the same key scheme and received entitlement messages that enable an authorised receiver to decrypt the secondary data stream(s) are forwarded to the secondary terminal(s).

This is the method carried out by the terminal according to the invention.

According to a last aspect of the invention, a computer program is provided, suitable for loading into a terminal for receiving and re-transmitting digital data, comprising a processor, memory, a first network adapter for receiving a data stream from a primary transmitter through a first network in a first format, an arrangement for receiving entitlement messages, enabling an authorised receiver to decrypt an encrypted data stream, and at least one further network adapter for connection to a secondary network, so that the terminal programmed in this way is provided with the functionality of a terminal according to the invention.

Thus, a terminal with the right hardware is easily adapted to function as a terminal according to the invention, providing content providers with more certainty that they control the distribution of the content up to the end user.

The invention will now be explained in further detail with reference to the accompanying drawings.

DETAILED DESCRIPTION

Figure 1:
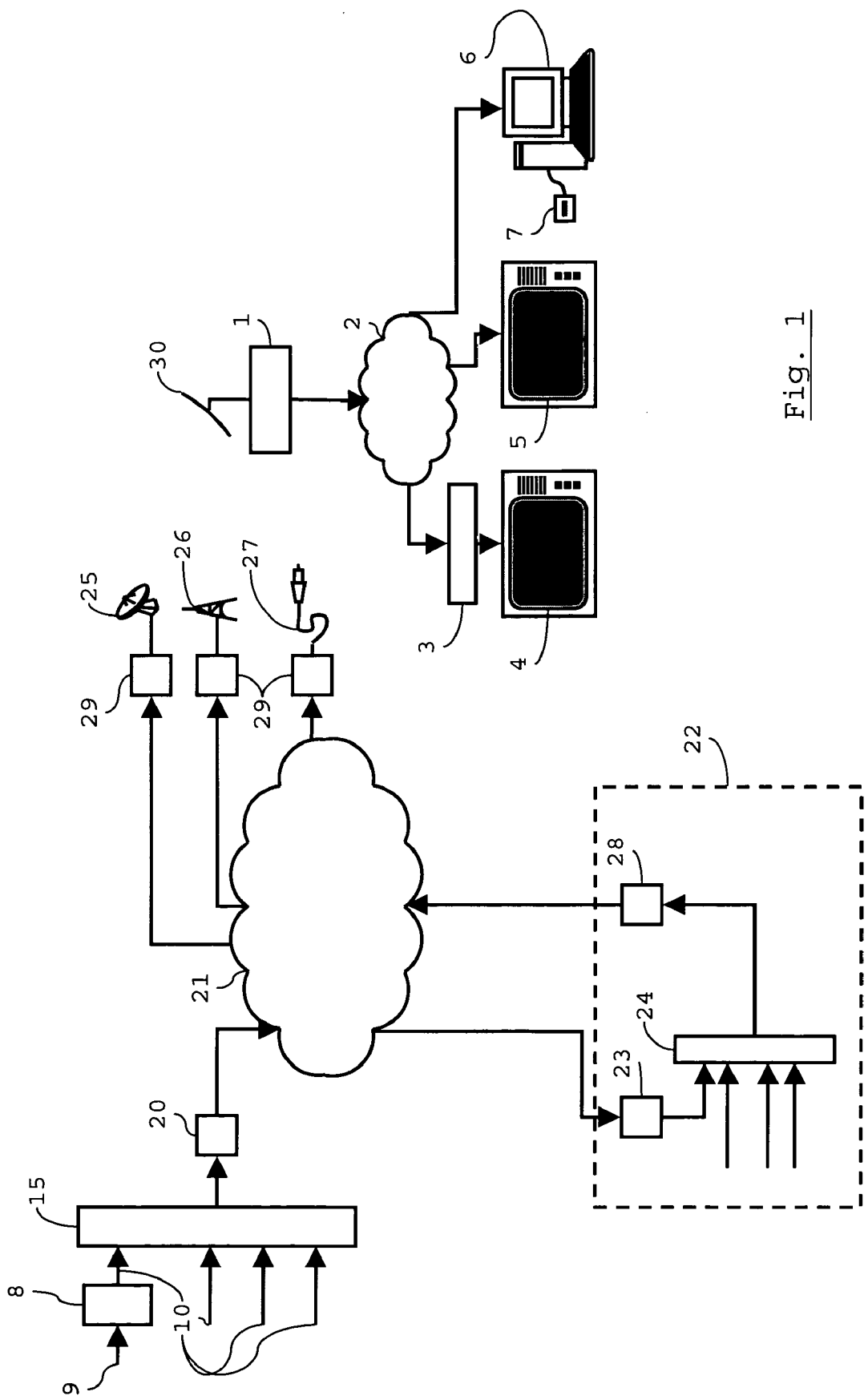
FIG. 1 gives a schematic overview of a digital broadcasting architecture, in which the invention is employed.

Referring to FIG. 1, the invention provides a primary receiver 1, which is used as a gateway between two networks, namely a delivery network and a home network 2, in this example. The primary receiver 1 receives the data in a first format, and retransmits it in a second format. Although the invention is not limited to a single type of data, this description will focus on an example wherein MPEG-2 Transport Stream packets are broadcast to the primary receiver 1, which retransmits them to a plurality of secondary receivers through the home network 2. Examples of secondary receivers, shown in FIG. 1, are a set-top box 3, connected to an analogue television set 4, a digital television set 5 and a personal computer 6, equipped with a network card, media player and smart card reader 7. The invention is not limited to use in a broadcast environment; the primary receiver 1 may also receive the digital data from a source over a point-to-point connection.

The MPEG-2 standard ISO/IEC 13818 describes the method of data encoding and transport in some detail. This description will primarily recount those aspects that are relevant to the invention. Reference may be had to the standard for further details.

In FIG. 1, a broadcast source 8 encodes an elementary stream 9 into a single programme MPEG-2 transport stream 10. An elementary stream is a single digitally-coded and possibly MPEG-compressed component of a programme, for example, video or audio. Data from several elementary streams belonging to a programme are carried in Programme Elementary Stream (PES) packets 11 (see FIG. 2). A programme corresponds to a channel in analogue broadcasting. The PES packet 11 comprises a PES packet header 12 and a PES packet payload 13. Data from the elementary streams are multiplexed in the PES packets 11, with the PES packet header 12 indicating which elementary stream the PES packet payload 13 belongs to.

Figure 2:
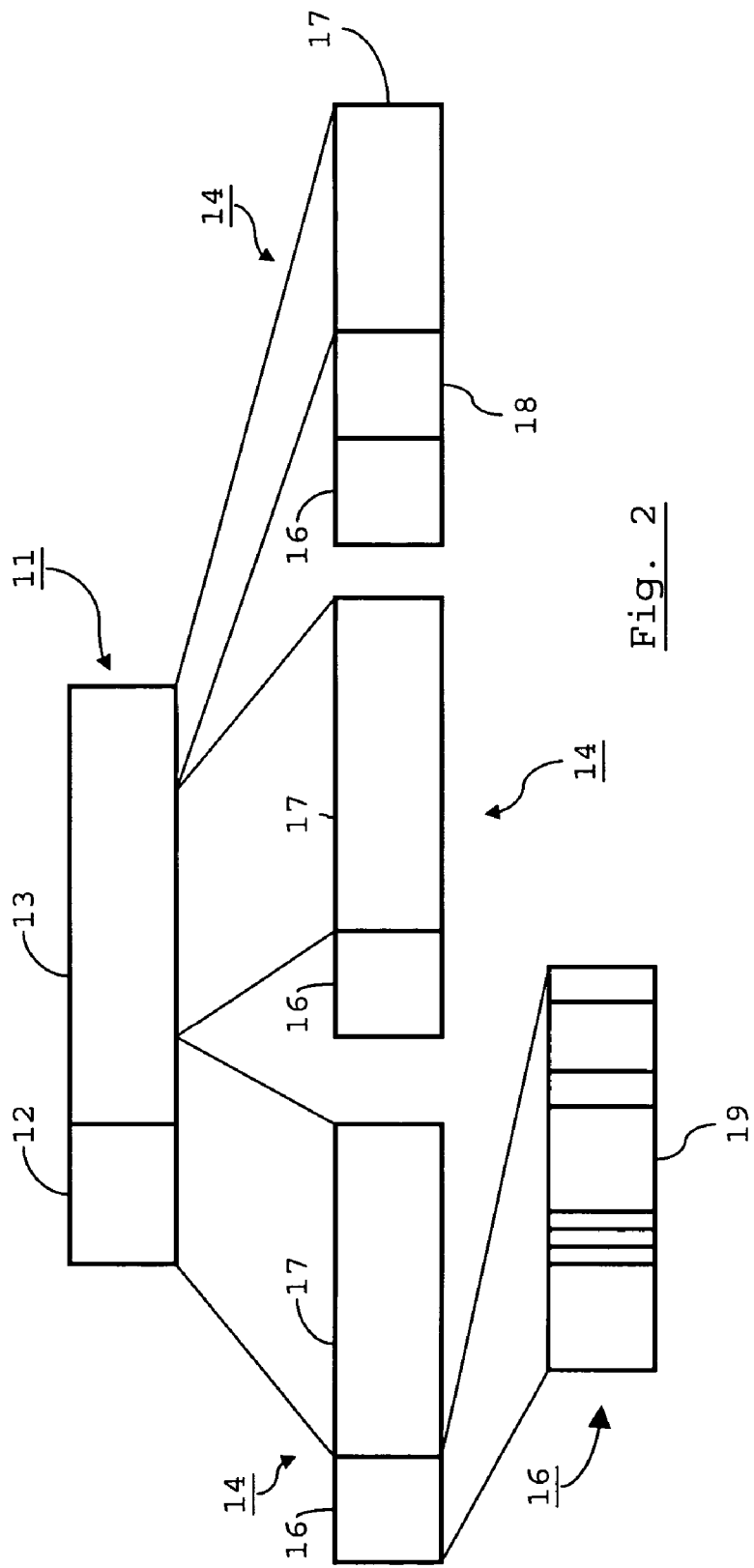
FIG. 2 is a schematic diagram showing the composition of Transport Stream Packets.

The PES packets 11 are carried by MPEG-transport stream (TS) packets 14 (FIG. 2). An MPEG-multiplexer 15 (FIG. 1) multiplexes multiple transport streams into one multi-program transport stream, so that multiple programmes are carried in one stream. Each TS packet 14 (FIG. 2) comprises a TS packet header 16 and a TS packet payload 17. In addition, an adaptation field 18 ensures that all TS packets 14 are of the same length, regardless of the length of the PES packet 11 they are carrying. The TS packet header 16 comprises, amongst others, a packet identifier (PID) 19. The packet identifier 19 is a unique integer value used to associate elementary streams of a program in a single or multi-programme transport stream.

A Programme Association Table (PAT) in the TS packets 14 with PID-value 0 comprises a list of all the programmes available in the transport stream. Each programme in the PAT is associated with a Programme Map Table (PMT), which gives details about the programme and the elementary streams of which it is comprised.

Referring again to FIG. 1, a network adapter 20 converts the TS packets 14 into a format suitable for transmission through a primary network 21, to a regional centre 22. The regional centre receives the transport stream through a network adapter 23. A bitstream splicer/multiplexer 24 is used to splice in other transport streams, which may include Service Information (SI), an Electronic Program Guide (EPG) and teletext. The bitstream splicer/multiplexer 24 updates the PID values and the PMT and PAT, to avoid conflicting values. The resultant MPEG transport stream is then linked up to a satellite transmitter 25, a terrestrial transmitter 26 or a cable transmitter 27, through the primary network 21, using suitable network adapters 28 and 29.

The satellite, terrestrial or cable network forms a delivery network, for distributing the data to the homes of receivers. Other suitable types of network are those employing fibre to the home connections, ADSL (Asynchronous Digital Subscriber Line), Ethernet connections, etc. In the context of the present invention, the distribution network will be referred to as the first network.

Either the broadcast source 8 or the regional centre 22, or both, may use a conditional access system to prevent unauthorised access to the contents of the data stream that is linked up. For this purpose, either the PES packet payloads 13 or the TS packet payloads 17 are scrambled. Note that, in a multiplexed transport stream, which in fact comprises multiple transport streams, each carrying one elementary stream, only a subset of the transport streams may be scrambled. A field in the PES packet header 12 or TS packet header 16 indicates whether the payload of that particular packet is encrypted or not. To avoid overcomplicating the description, it will be assumed that scrambling is carried out at the transport stream level. In one exemplary embodiment, a symmetric encryption algorithm, such as DES, is used to scramble the TS packet payloads 17.

It is noted that it is possible to scramble all the TS packet payloads 17 with the same key and/or algorithm, regardless of PID-value, or to use a different key and/or algorithm for each elementary stream or for each set of elementary streams belonging to one programme. Assuming that the regional centre 22 is the CA-system manager, it will splice in one or more transport streams that contain entitlement control messages. It will additionally modify the PMT for the scrambled programme, by adding to it a CA-descriptor, detailing the type of CA system being used and the PID of the entitlement messages. The entitlement control messages comprise the control word, the key used for scrambling, and de-scrambling. The entitlement control messages (ECMs) are themselves encrypted, with a different key. A further data stream comprises entitlement management messages (EMMs), these enable authorised subscribers or groups of subscribers to decrypt the ECMs, from which they can retrieve the control word.

Returning to FIG. 1, the primary receiver 1 receives the MPEG-2 transport stream by means of a satellite dish 30, to which it is connected. The transport stream is in a format suitable for transmission through the satellite delivery network, for example conformant to DVB-S (Digital Video Broadcasting-Satellite). The primary receiver 1 makes part or all of the data available to end devices through the home network 2, through which data is transmitted in a different format. The primary receiver 1 is thus a delivery network gateway: a device that is connected to one or more delivery networks and one or more home network segments. It includes one or more connecting components so that it can interconnect the delivery network (i.e. the satellite network) with the home network segments on any of the OSI layers. It can function as a bridge or router, interconnecting different link layer technologies, or it can act as a gateway, also providing functionality on the OSI layer 4 and above. Consequently, the term format means the manner in which the data is adapted to conform to the protocol stack of a certain type of network. A first network (the satellite network) has a different protocol stack than the home network 2, meaning that it differs at one or more of the link layer level, the network layer level or the transport layer level. Note that this means that the primary receiver 1 must, where data is transmitted in frames and/or packets, add, remove or modify packet headers, and/or re-segment packet payloads to conform to the protocol stack of the home network 2. The term packet refers to a short section of data that is transmitted as a unit in a communications network. It encompasses packets at levels below that of the network layer, which are commonly known as frames, as well as the types of packets known as cells. A packet comprises a header or trailer and a payload. Packet format refers to the composition of the packet in terms of the size of the payload, and in terms of the various fields that are present in the header/trailer.

Figure 3:
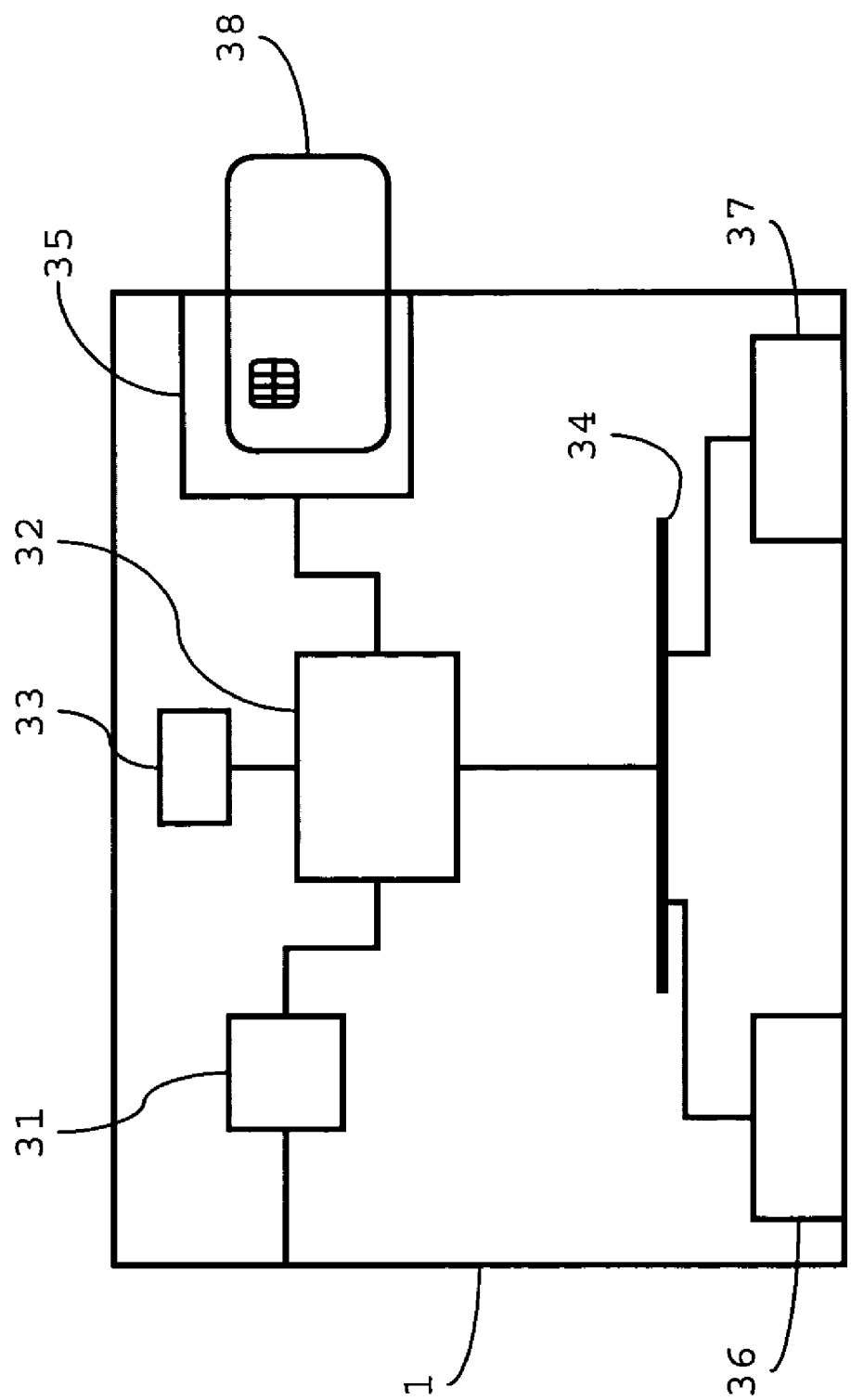
FIG. 3 is a schematic diagram showing some components of a terminal according to the invention.

FIG. 3 shows schematically the components of the primary receiver 1. It comprises a tuner/demodulator 31, which removes the carrier wave to retrieve the base band signal comprising the MPEG transport stream. The primary receiver 1 uses a processor 32 and memory 33 to process the packets. The processor 32 is connected to a system bus 34. In this example, a smart card reader 35, a modem 36 and an Ethernet card 37 are connected to the system bus 34. The modem 36 and Ethernet card 37 function as network adapters, i.e. they, together with appropriate software running on the processor, implement a link interface, enabling data to be exchanged over a network according to the correct protocol for that network. A smart card 38 is inserted into the smart card reader 35 to provide authorisation for receiving one or more programmes. As an alternative to the smart card 38, another type of portable security device, for example a USB dongle or PCMCIA format card may be used. A software-implemented security module for providing authorisation is also conceivable. In this example, the home network 2 is an Ethernet, i.e. the set-top box 3, digital television set 5 and personal computer 6 also comprise Ethernet cards. It is, however, stressed that any other type of home network could be employed, for example one using USB connections, IEEE 1394, IEEE 802.11, etc.

According to the invention, the primary receiver 1 receives the transport stream in the DVB-S format. Then, using the PIDs in the PAT and PMT, it determines which elementary streams comprise the EMMs and ECMs, and which comprise the elementary streams comprising the content data, EPG data, possibly IP data, etc. Some or all of the transport streams comprising the latter are descrambled, insofar as the smart card 38 comprises information authorising the primary receiver 1 to retrieve appropriate control words. For this purpose, the smart card 38 processes the ECMs to return the control word to the processor 32, which carries out the descrambling.

Then, the decrypted data streams are re-packetised. This means that they are divided into payloads of the appropriate length, and that the necessary headers, defined in the protocols used in the home network 2 are added. Then, these packets are reencrypted. The same control words are used to re-encrypt the packets in the data packet format of the home network 2. Because the same key scheme is used, the data in the transport streams comprising the entitlement messages is simply forwarded. No new entitlement messages are formed.

It is noted that the primary receiver 1 does not differ substantially from the secondary receivers, in that it cannot decrypt the entitlement messages or descramble the content data without the smart card 38. It is not able to form its own entitlement messages, either. This has the twofold advantage that the primary receiver 1 is relatively simple and that the regional centre is assured that its CA system remains in use to protect the content data against unauthorised access.

Figure 4:
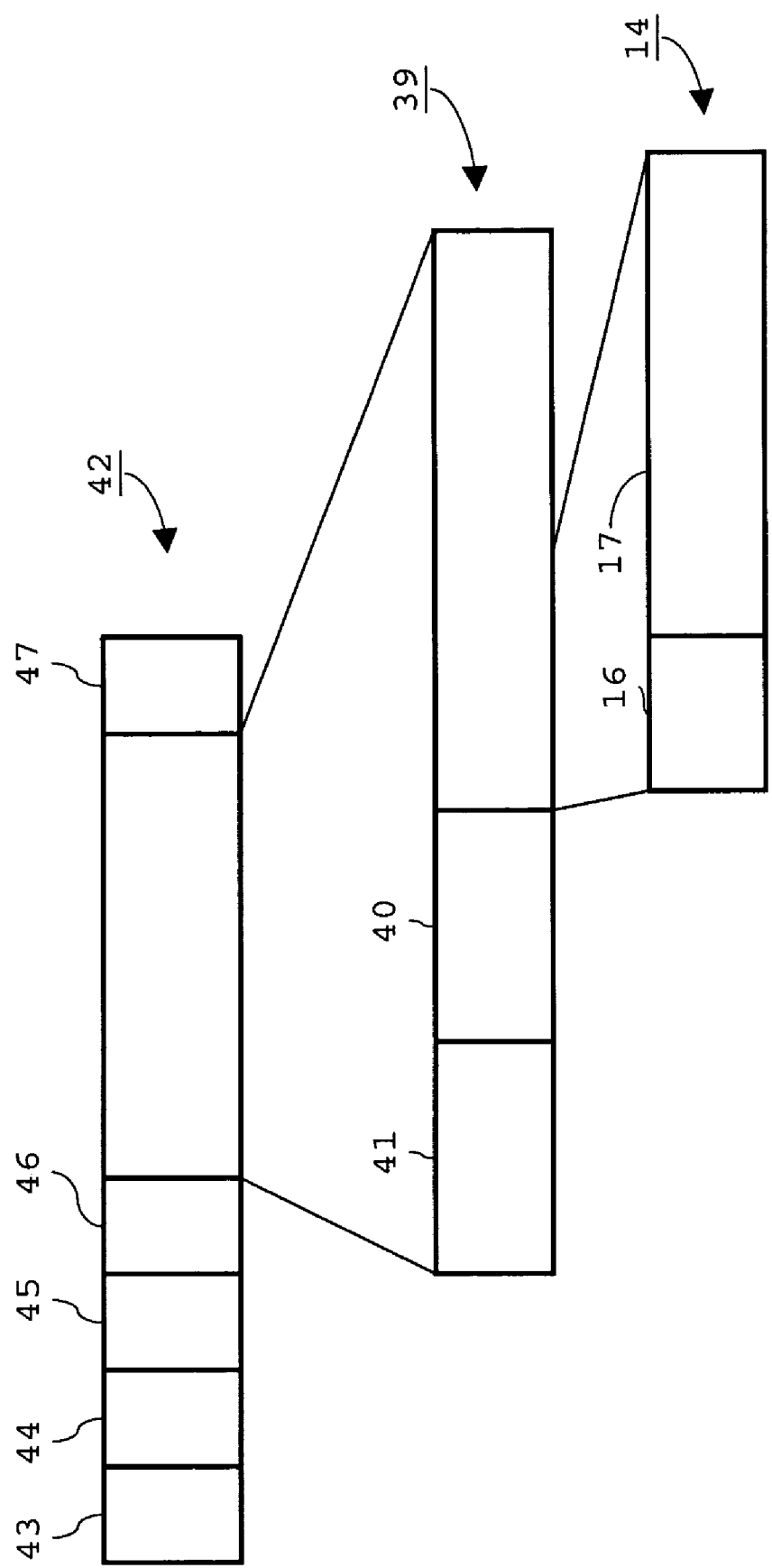
FIG. 4 is a schematic diagram showing the composition of a data packet generated by a terminal according to the invention.

The primary receiver 1 re-packetises the TS packets 14 into the format for the home network 2. In this example, the home network protocol stack uses Ethernet at the link layer level, IP at the network layer level and UDP at the transport layer level. FIG. 4 shows the composition of the packets transmitted through the home network 2. Several, e.g. about seven, TS-packets 14 form the payload of an IP packet 39 (also known as an IP datagram). The IP packet 39 further comprises a UDP header 40 and an IP header 41. The IP header 41 comprises the IP address of the secondary receiver for which the IP packet 39 is intended, or it may comprise a multicast address. The IP packet 39 forms the payload of an Ethernet frame 42, comprising a preamble 43, a destination address 44, a source address 45, a type 46 and a CRC checksum 47. The destination address 44 is a broadcast, multicast or unicast address, used by the secondary receivers to retrieve the Ethernet frames intended for them. It is noted that it would also have been possible to directly encapsulate the TS packets 14 in the Ethernet frame 42, without adding IP and UDP headers 41,40. Using IP over Ethernet, however, makes it possible to transmit the data over a wider range.

In one exemplary embodiment, the primary receiver 1 uses a form of encryption under the stack, as described more fully in applicant's co-pending international application WO 02/07378.

In an exemplary embodiment of embodiment of the invention, the secondary receivers are able to send selection commands to the primary receiver 1 through the home network 2. In response to these selection commands, the primary receiver 1 filters out those elementary streams in the multi-programme transport stream that are not requested by any of the secondary receivers. It is thus able to transmit only a subset of elementary data streams to each secondary receiver.

The secondary receivers each also comprise a smart card reader. An inserted smart card enables them to retrieve the ECMs from the stream of data received from the primary receiver 1, and to descramble certain elementary streams.

The primary receiver 1 can also receive the TS packets using the modem 36. In this case, the TS packets may already be encapsulated in IP packets. However, instead of being encapsulated in Ethernet packets, the received IP packets are typically carried in PPP packets or ATM cells at the link layer level. The primary receiver 1 must therefore carry out the method according to the invention to re-transmit the received data in Ethernet frame format.

As described above, the primary receiver 1 re-packetises the decrypted data streams. Within the scope of the invention, a further variant of the primary receiver 1 is possible. In this variant, the primary receiver 1 is arranged to receive a primary data stream comprising information encoded in a first format, to re-encode the information in a second format, and to include data comprising the re-encoded information in at least one of the secondary data streams. This so-called transcoding may entail de-compressing and re-compressing the received data. As an example, the primary receiver 1 may demultiplex a transport stream to retrieve a programme elementary stream encoded and compressed according to the MPEG-4 standard, de-compress the encoded video data, and re-compress and encode the video data according to the MPEG-2 standard. The transcoded video data is then multiplexed with the other associated programme elementary streams containing audio and data into a transport stream which is packetised and transmitted to one or more of the secondary receiver. Of course, transcoding from MPEG-4 to MPEG-2 is just an advantageous example. Where data is being re-transmitted, the primary receiver 1 can also be arranged to transcode still images, for example from JPEG to GIF. These embodiments have the advantageous effect that it is possible to continue to use legacy receivers as secondary receivers, if a broadcaster has switched to a different format not supported by the secondary receivers. It is then only necessary to invest in the primary receiver 1. Another effect, especially of the recompression, is that account can be taken of different bandwidths available on the home network 2 and the distribution network.

In one exemplary embodiment, the provider of the primary data stream is given a further instrument to control the secondary distribution of information. One way of doing this is to provide a plurality of different entitlement messages, each enabling an authorised receiver to decrypt an encrypted data stream encrypted according to the key scheme, wherein each entitlement message comprises a specification of at least one terminal. In other words, several of the ECMs sent from the broadcast source 8 to the primary receiver 1 may contain the same control word, but a different specification of a receiver (either the type or an identification of one or more specific devices). The primary receiver retrieves the ECMs specifying itself, in order to decrypt the received data stream. It forwards to each secondary receiver only those ECMs comprising a specification to which that secondary receiver conforms.

A further instrument to control distribution involves transmitting messages authorising transmission of at least one of the secondary data streams to at least one of the secondary terminals. The message can be a simple message specifying only whether re-distribution is allowed at all, or it can limit re-distribution to certain types of secondary receivers or a certain maximum number of secondary receivers. The primary receiver 1 is arranged to transmit only those secondary data streams to those secondary terminals for which an authorisation has been received. In combination with device-specific ECMs, the primary receiver 1 can, for example, filter out certain of the ECMs, to restrict the number of secondary receivers that can simultaneously access the data.

The invention is not limited to the described embodiments, but can be varied in a number of ways within the scope of the attached claims. For instance, the scrambled data may comprise IP packets. In this case, the primary receiver 1 may remove the encapsulation in TS-packets before re-transmitting the data.

What is claimed is:

1. A terminal for receiving and retransmitting information, the terminal including:
    a first network adapter configured to receive in a first format a primary data stream in which the information has been encoded and encrypted according to a key scheme from a primary transmitter through a first network,
    an arrangement configured to receive entitlement messages, enabling an authorised receiver to decrypt the encrypted data stream; and
    at least one further network adapter for connection to a secondary network, wherein the terminal is configured to retransmit at least part of the information in at least one secondary data stream in a second format, differing from the first format, through the second network to at least one secondary terminal connected to the secondary network, wherein the terminal is configured to transmit the at least one secondary data stream encrypted according to the same key scheme and to forward received entitlement messages that enable an authorised receiver to decrypt the at least one secondary data stream to the at least one secondary terminal; and
    wherein the terminal is arranged to decrypt the received primary data stream and to encrypt the at least one secondary data stream according to the key scheme; and
    wherein the terminal is further arranged to de-multiplex a decrypted data stream comprising multiple elementary data streams, and to retransmit information encoded in only a subset of the elementary data streams to the at least one secondary terminal over the secondary network.

2. The terminal according to claim 1, wherein the terminal is arranged to receive the encrypted primary data stream in a first data packet format, and to transmit at least one of the secondary streams in a second data packet format.

3. The terminal according to claim 2, wherein the terminal is arranged to decrypt a payload of a received encrypted data packet in the first data packet format, to form clear data from the decrypted payload, and to subsequently re-packetise the clear data to conform to the second data packet format.

4. The terminal according to claim 2, wherein the terminal is arranged to de-multiplex an encrypted data stream comprising multiple encrypted elementary data streams, and to retransmit a subset of the elementary data streams.

5. The terminal according to claim 1, wherein the terminal is arranged to include one or more addresses, identifying one or more secondary terminals, in the transmitted secondary data stream(s).

6. The terminal according to claim 1, wherein the terminal is arranged to receive the primary data stream comprising information encoded in a first format, to re-encode the information in a second format, and to include data comprising the re-encoded information in at least one of the secondary data streams.

7. The terminal according to claim 1, wherein the terminal is arranged to receive the primary data stream comprising data compressed in accordance with a first scheme, to de-compress the data, to re-compress the data in accordance with a second scheme, and to include the recompressed data in at least one of the secondary data streams.

8. The terminal according to claim 1, comprising an arrangement for receiving a plurality of different entitlement messages, each enabling an authorised receiver to decrypt an encrypted data stream encrypted according to the key scheme, wherein each entitlement message comprises a specification of at least one terminal, wherein the terminal is arranged to forward to a secondary terminal only those entitlement messages comprising a specification to which the secondary terminal conforms.

9. A terminal for receiving and retransmitting information, the terminal including:
a first network adapter configured to receive in a first format a primary data stream in which the information has been encoded and encrypted according to a key scheme from a primary transmitter through a first network,
an arrangement configured to receive entitlement messages, enabling an authorised receiver to decrypt the encrypted data stream; and
at least one further network adapter for connection to a secondary network, wherein the terminal is configured to retransmit at least part of the information in at least one secondary data stream in a second format, differing from the first format, through the second network to at least one secondary terminal connected to the secondary network, wherein the terminal is configured to transmit the at least one secondary data stream encrypted according to the same key scheme and to forward received entitlement messages that enable an authorised receiver to decrypt the at least one secondary data stream to the at least one secondary terminal; and
wherein the terminal is arranged to decrypt the received primary data stream and to encrypt the at least one secondary data stream according to the key scheme; and
wherein the terminal is further arranged to de-multiplex a decrypted data stream comprising multiple elementary data streams, and to retransmit information encoded in a subset of the elementary data streams; and
wherein the terminal is arranged to receive selection commands from the at least one secondary terminal, and to select the elementary data streams comprised in the subset according to the selection commands.

10. A terminal for receiving and retransmitting information, the terminal including:
a first network adapter configured to receive in a first format a primary data stream in which the information has been encoded and encrypted according to a key scheme from a primary transmitter through a first network,
an arrangement configured to receive entitlement messages, enabling an authorised receiver to decrypt the encrypted data stream; and
at least one further network adapter for connection to a secondary network, wherein the terminal is configured to retransmit at least part of the information in at least one secondary data stream in a second format, differing from the first format, through the second network to at least one secondary terminal connected to the secondary network, wherein the terminal is configured to transmit the at least one secondary data stream encrypted according to the same key scheme and to forward received entitlement messages that enable an authorised receiver to decrypt the at least one secondary data stream to the at least one secondary terminal;
wherein the terminal is arranged to receive messages authorising transmission of at least one of the secondary data streams to at least one of the secondary terminals and is arranged to transmit only those secondary data streams to those secondary terminals for which an authorisation has been received.

11. A digital data distribution system, including:
a primary network;
a primary data transmitter, connected to the primary network and arranged to transmit information encoded in an encrypted primary data stream, encrypted according to a key scheme, through the primary network in a first format;
an entitlement message transmitter, arranged to transmit entitlement messages enabling an authorised receiver to decrypt the encrypted data stream;
a secondary network;
at least one secondary terminal, connected to the secondary network; and
a primary terminal, connected to the first and the second network, arranged to receive the encrypted data stream from the primary data transmitter through the first network and to retransmit at least part of the information, encoded in at least one secondary data stream in a second format, differing from the first format, to the at least one secondary terminal connected to the secondary network,
wherein the primary terminal is configured to transmit the at least one secondary data stream encrypted according to the same key scheme and to forward received entitlement messages that enable an authorised receiver to decrypt the at least one secondary data stream to the at least one secondary terminal; and
wherein the terminal primary terminal is arranged to decrypt the received primary data stream and to encrypt the at least one secondary data stream according to the key scheme; and
wherein the primary terminal is further arranged to de-multiplex a decrypted data stream comprising multiple elementary data streams, and to retransmit information encoded in a subset of the elementary data streams; and
wherein the terminal is arranged to receive selection commands from the at least one secondary terminal, and to select the elementary data streams comprised in the subset according to the selection commands.

12. A digital data distribution system, including:
a primary network;
a primary data transmitter, connected to the primary network and arranged to transmit information encoded in an encrypted primary data stream, encrypted according to a key scheme, through the primary network in a first format;
an entitlement message transmitter, arranged to transmit entitlement messages enabling an authorised receiver to decrypt the encrypted data stream;
a secondary network;
at least one secondary terminal, connected to the secondary network; and
a primary terminal, connected to the first and the second network, arranged to receive the encrypted data stream from the primary data transmitter through the first network and to retransmit at least part of the information, encoded in at least one secondary data stream in a second format, differing from the first format, to the at least one secondary terminal connected to the secondary network,
wherein the primary terminal is configured to transmit the at least one secondary data stream encrypted according to the same key scheme and to forward received entitlement messages that enable an authorised receiver to decrypt the at least one secondary data stream to the at least one secondary terminal; and wherein the primary terminal is arranged to receive messages authorising transmission of at least one of the secondary data streams to at least one of the secondary terminals and is arranged to transmit only those secondary data streams to those secondary terminals for which an authorisation has been received.

13. A method of receiving and retransmitting digital data, the method including:

receiving data streams encoded in an encrypted primary data stream encrypted according to a key scheme from a primary transmitter through a primary network in a first format, receiving entitlement messages, enabling an authorised receiver to decrypt the primary data stream, decrypting the primary data stream to a decrypted data stream comprising multiple elementary data streams;

de-multiplexing the decrypted data stream to obtain the multiple elementary data streams, retransmitting at least part of the information, encoded in at least one secondary data stream in a second format, differing from the first format, for a subset of the elementary data streams to at least one secondary terminal through a secondary network, wherein the at least one secondary data stream is transmitted encrypted according to the same key scheme and received entitlement messages that enable an authorised receiver to decrypt the at least one secondary data stream are forwarded to the at least one secondary terminal, and receiving at least one selection command from the at least one secondary terminal, and to select the elementary data streams comprised in the subset according to the selection commands.

14. A method of receiving and retransmitting digital data, the method including:

receiving information encoded in an encrypted primary data stream encrypted according to a key scheme from a primary transmitter through a primary network in a first format, receiving entitlement messages, enabling an authorised receiver to decrypt the primary data stream, retransmitting at least part of the information, encoded in at least one secondary data stream in a second format, differing from the first format, to at least one secondary terminal through a secondary network, wherein the at least one secondary data stream is transmitted encrypted according to the same key scheme and received entitlement messages that enable an authorised receiver to decrypt the at least one secondary data stream are forwarded to the at least one secondary terminal, receiving at least one message authorising transmission of at least one secondary data stream to at least one of the secondary terminals, and transmitting only those secondary data stream to those secondary terminals for which an authorisation has been received.

15. A machine readable medium storing a set of instructions that, when executed by a machine, cause the machine to execute a method to receive and retransmit digital data, the method including:

receiving data streams encoded in an encrypted primary data stream encrypted according to a key scheme from a primary transmitter through a primary network in a first format, receiving entitlement messages, enabling an authorised receiver to decrypt the primary data stream, decrypting the primary data stream to a decrypted data stream comprising multiple elementary data streams;

de-multiplexing the decrypted data stream to obtain the multiple elementary data streams, retransmitting at least part of the information, encoded in at least one secondary data stream in a second format, differing from the first format, for a subset of the elementary data streams to at least one secondary terminal through a secondary network, wherein the at least one secondary data stream is transmitted encrypted according to the same key scheme and received entitlement messages that enable an authorised receiver to decrypt the at least one secondary data stream are forwarded to the at least one secondary terminal, and receiving at least one selection command from the at least one secondary terminal, and to select the elementary data streams comprised in the subset according to the selection commands.

16. A machine readable medium storing a set of instructions that, when executed by a machine, cause the machine to execute a method to receive and retransmit digital data, the method including:

receiving data streams encoded in an encrypted primary data stream encrypted according to a key scheme from a primary transmitter through a primary network in a first format, receiving entitlement messages, enabling an authorised receiver to decrypt the primary data stream, decrypting the primary data stream to a decrypted data stream comprising multiple elementary data streams;

de-multiplexing the decrypted data stream to obtain the multiple elementary data streams, retransmitting at least part of the information, encoded in at least one secondary data stream in a second format, differing from the first format, for a subset of the elementary data streams to at least one secondary terminal through a secondary network, wherein the at least one secondary data stream is transmitted encrypted according to the same key scheme and received entitlement messages that enable an authorised receiver to decrypt the at least one secondary data stream are forwarded to the at least one secondary terminal, and receiving at least one selection command from the at least one secondary terminal, and to select the elementary data streams comprised in the subset according to the selection commands.

* * * * *